United States Patent [19]
Ekberg

[11] Patent Number: 5,900,147
[45] Date of Patent: May 4, 1999

[54] OSCILLATABLE FILTER MEDIUM

[75] Inventor: Bjarne Ekberg, Turku, Finland

[73] Assignee: Outokumpu Mintec Oy, Espoo, Finland

[21] Appl. No.: 08/793,626

[22] PCT Filed: Aug. 18, 1995

[86] PCT No.: PCT/FI95/00436

§ 371 Date: Apr. 8, 1997

§ 102(e) Date: Apr. 8, 1997

[87] PCT Pub. No.: WO96/05905

PCT Pub. Date: Feb. 29, 1996

[30] Foreign Application Priority Data

Aug. 19, 1994 [FI] Finland ..................................... 943809

[51] Int. Cl.[6] .................................................. B01D 35/06
[52] U.S. Cl. .......................... 210/223; 210/243; 210/359; 210/388; 210/391; 210/407; 210/416.1; 210/500.1; 210/510.1
[58] Field of Search ..................................... 210/748, 223, 210/243, 785, 348, 359, 388, 391, 416.1, 407, 496, 500.1, 510.1, 500.21, 500.25

[56] References Cited

U.S. PATENT DOCUMENTS

| | | |
|---|---|---|
| 3,517,811 | 6/1970 | Newfarmer . |
| 3,862,030 | 1/1975 | Goldberg ................................ 210/496 |
| 4,253,962 | 3/1981 | Thompson . |
| 4,279,751 | 7/1981 | Fishgal ................................... 210/785 |
| 4,352,570 | 10/1982 | Firth . |
| 4,357,758 | 11/1982 | Lampinen . |
| 4,904,394 | 2/1990 | Clarke et al. ........................... 210/748 |
| 4,935,139 | 6/1990 | Davidson et al. .................. 210/500.25 |
| 4,946,602 | 8/1990 | Ekberg et al. . |
| 5,039,347 | 8/1991 | Hindstrom et al. . |
| 5,160,616 | 11/1992 | Blake-Coelman ..................... 210/407 |
| 5,178,777 | 1/1993 | Ekberg et al. . |

FOREIGN PATENT DOCUMENTS

| | | |
|---|---|---|
| 76705 | 12/1988 | Finland . |
| 82388 | 3/1991 | Finland . |
| 61739 | 8/1992 | Finland . |
| 87539 | 1/1993 | Finland . |

OTHER PUBLICATIONS

Derwent Abstract, Russian Application No. 93–412312, 1995.

*Primary Examiner*—David A. Reifsnyder
*Attorney, Agent, or Firm*—Morgan & Finnegan

[57] ABSTRACT

The invention relates to a filter medium particularly for filtering in a suction drier. According to the invention, the filter medium is manufactured of a material that can be made to oscillate essentially at a standard frequency.

13 Claims, No Drawings

OSCILLATABLE FILTER MEDIUM

The present invention relates to a filter medium suited to be used in the drying of finely divided material, particularly in connection with a suction drier.

The FI patent 61,739 introduces a drying method and apparatus for drying web-like, pulverous, solid or porous material, in which method the material to be dried is put, by intermediation of a fine porous liquid-saturated suction surface, into hydraulic contact with a liquid maintained at an underpressure in relation to the material to be dried. The apparatus used in the said method comprises a fine porous liquid suction surface, where the radii of the fine pores are mainly within the range 0.5–2 micrometers.

The fine porous liquid suction surface forms the filter surface for the filter medium of the suction drier, which filter surface is set into contact with the material to be dried, such as slurry. When the filter surface is for instance plane-like, and when there is created underpressure at the surface opposite to the filter surface of the filter medium, on the filter surface there is created, due to the suction, a cake filtered of the material to be dried, which cake is then scraped off the filter surface. However, the filter surface is susceptible to choking, because the pore structure of the filter surface of the filter medium, and thus also that of the filter medium itself, is gradually filled with finely divided material to be dried.

It is known in the prior art to use ultrasound in the cleaning of the filter surface of the filter medium in a suction drier, as is described in the FI patent 76,705. In the method of this FI patent 76,705, the use of ultrasound requires that for the duration of ultrasonically boosted cleaning, the filter surface is set into contact with a connecting and cleaning liquid, such as water. In that case, when the filter surface is surrounded by water, the required ultrasound power is not very high, and the risk for corrosion caused by cavitation is eliminated. However, the changing of the connecting and cleaning liquid required around the filter medium reduces the capacity available in the suction drier, and thus increases the installation and running costs of the suction drier.

From the FI patent 82,388, there is known a cleaning method for the filter medium of a suction drier, in which method the cleaning with an ultrasonic oscillator takes place essentially immediately after scraping the filter medium. In this method of the FI patent 82,388, the ultrasonic oscillator is located in the tank of the slurry to be filtered, underneath the liquid surface, in order to carry out the cleaning of the filter medium in continuous operation. With a high solid content of the surrounding slurry, the required ultrasonic power rises high, too. Likewise, the surrounding slurry corrodes the shell of the ultrasonic oscillator due to intensive cavitation. An increase in the ultrasonic power and the changing of the oscillator shells raise the running costs of the suction drier.

When applying a mechanical scraper for detaching the filter cake, part of the filter cake remains in between the scraper and the filter surface. Therefore the FI patent 87,539 introduces a method where prior to starting the removal of the filter cake, a momentous reversed pressure is caused in the suction drier, so that a thin liquid film is created in between the filter surface and the filter cake. In connection with the creation of the liquid film, gas blowing is directed to the other edge of the filter cake, so that the filter cake begins to detach from the filter surface. The gas blowing directed to the edge of the filter cake can, when necessary, be boosted by means of another gas blowing arranged at the middle part of the filter surface. The use of reversed pressure and two-step gas blowing for instance with thin filter cakes is cumbersome, because in between the blowing steps and at the end of the removal of the filter cake, there always is a serious risk that the filter cake is broken into small parts.

The object of the present invention is to eliminate some of the drawbacks of the prior art and to achieve an improved filter medium for a suction drier, whereby the structure of the suction drier can be advantageously simplified, for instance for treating the filter medium. The essential novel features of the invention are apparent from the appended patent claims.

According to the invention, the filter medium is manufactured of a material that can be made to oscillate at a standard frequency. The standard frequency as such depends on the material of the filter medium, and each material thus has its own distinctive standard frequency. According to the invention, the standard frequency of the filter medium is within the range 20–60 kHz, advantageously 25–40 kHz.

The filter medium of the invention is advantageously manufactured either of a ceramic, metallic or other such material that can be made to oscillate at a standard frequency. In the material to be used as the filter medium, there are formed apertures or flow channels through the material in order to conduct the filter liquid through the filter medium, from the filter surface thereof to the opposite surface. When the filter medium is a porous material, its porosity can be made use of by advantageously creating flow channels through the filter medium, which flow channels are formed of the pores of the material. If flow channels are not created in the material by means of the porosity, essentially small apertures through the filter medium are formed in the filter medium in order to conduct the filter liquid through the filter medium. The flow path of the filter liquid through the filter medium can advantageously also be a combination of the flow channel formed by the pores and the apertures created in the filter medium.

The oscillation of the filter medium according to the invention, when the filter medium is some ceramic material, is achieved for example by means of an alternating voltage connected to the filter medium. For a metallic material, the oscillation of the filter medium can be achieved for instance by means of a magnetic field connected to the filter medium.

The filter medium according to the invention can be manufactured of some material with a piezoelectric capacity, such as quartz, barium titanate, lithium sulfate, lithium columbate, lead zirconate or lead metacolumbate. By connecting to this type of filter medium an alternating voltage with the same frequency as the resonance frequency of the filter medium, the filter medium is made to oscillate. Now the filter medium operates in the same fashion as the oscillator of the ultrasonic washer employed in connection with the suction drier.

The filter medium of the invention can also be manufactured of some magnetostrictive material, such as nickel, or of alloys of nickel, iron and cobalt, as well as of aluminium and iron. The filter medium of the invention is thus made to oscillate, when the filter medium is coupled to a magnetic field with an oscillating frequency equal to the resonance frequency of the filter medium. The magnetic field is created for instance by installing a winding around the filter medium, so that the filter medium constitutes the core of the winding.

When using the filter medium according to the invention, the structure of the suction drier can be simplified by omitting for example some members required in the cleaning of the filter medium and for treating the filter cake created in the suction drier. Such auxiliary members have been used for instance in removing residual moisture from an essentially thick filter cake, because the residual moisture increases along with the thickness of the filter cake. However, auxiliary members used for example for moving particles contained in the filter cake with respect to each other, in order to channel at least part of the liquid drops forming the residual moisture, and consequently in order to reduce residual moisture, also require a lot of maintenance and sometimes the achieved profit does not compensate the costs. By employing the filter medium of the invention, the filter cake can be made to oscillate advantageously, and the end product is a drier filter cake.

By using the filter medium of the invention, the suction drier is made to operate advantageously also without a mechanical scraper used for removing the filter cake from the surface of the filter medium. The mechanical scraper functions well, if the filter cake is thick enough. However, the removal of a thin filter cake is cumbersome, and there are required additional members that increase the need for maintenance and repairs in the suction drier. On the other hand, when using the filter medium of the invention, also the removal of thin and even sticky filter cakes formed by very finely divided particles, such as kaolin and industrial minerals, from the surface of the filter medium can advantageously be carried out without any additional members provided in the suction drier.

The filter medium according to the invention, which filter medium can be set to oscillate, can also be used in the self-washing of the filter medium without separate ultrasonic oscillators, because the cavitation needed in the washing is created by oscillation without any additional members.

I claim:

1. A suction drier comprising a filter medium of a fine porous liquid-saturation suction surface forming a filter surface in which surface radii of the pores or within the range of 0.5–2 micrometers, means for creating an underpressure at the surface opposite to the filter surface of the filter medium while retaining the liquid-saturated filter surface, wherein said filter medium is made of a material capable of oscillating at essentially the standard frequency of the filter material, and said filter medium is connected to an alternating voltage or a magnetic field so as to cause the filter medium to oscillate at its standard frequency, the filter medium's standard frequency being within the range of 20–60 kHz.

2. A filter medium claim 1, characterized in that the filter medium is made of same piezoelectric material.

3. A filter medium according to claim 2, characterized in that the filter medium is made of quartz.

4. A filter medium according to claim 2, characterized in that the filter medium is made of barium titanate.

5. A filter medium according to claim 2, characterized in that the filter medium is made of lead zirconate.

6. A filter medium according to claim 2, characterized in that the filter medium is made of lithium sulfate.

7. A filter medium according to claim 2, characterized in that the filter medium is made of lithium columbate.

8. A filter medium according to claim 2, characterized in that the filter medium is made of lead metacolumbate.

9. A filter medium according to claim 1, characterized in that the oscillation of the filter medium is achieved by means of a magnetic field.

10. A filter medium according to claim 1, characterized in that the filter medium is made of same magnetostrictive material.

11. A filter medium according to claim 10, characterized in that the filter medium is made of nickel.

12. A filter medium according to claim 10, characterized in that the filter medium is made of an alloy of nickel, iron and cobalt.

13. A filter medium according to claim 10, characterized in that the filter medium is made of an alloy of aluminium and iron.

* * * * *

UNITED STATES PATENT AND TRADEMARK OFFICE
CERTIFICATE OF CORRECTION

ATENT NO.   :   5,900,147

DATED   :   May 4, 1999

INVENTOR(S) :   BJARNE EKBERG

It is certified that error appears in the above-identified patent and that said Letters Patent is hereby corrected as shown below:

Claim 2, line 1, after "medium" and before "claim" insert --according to--.

Claim 2, line 2, "same" should read -a--.

Claim 10, line 2, "same" should read -a--.

Signed and Sealed this

Thirty-first Day of August, 1999

Attest:

Q. TODD DICKINSON

*Attesting Officer*   Acting Commissioner of Patents and Trademarks